US007885218B2

(12) United States Patent
Nishiwaki

(10) Patent No.: US 7,885,218 B2
(45) Date of Patent: Feb. 8, 2011

(54) ON-VEHICLE VARIABLE PRIORITY INFORMATION TERMINAL

(75) Inventor: Takeshi Nishiwaki, Tokyo (JP)

(73) Assignee: Mitsubishi Kabushiki Kaisha, Tokyo (JP)

( * ) Notice: Subject to any disclaimer, the term of this patent is extended or adjusted under 35 U.S.C. 154(b) by 1287 days.

(21) Appl. No.: 11/367,347

(22) Filed: Mar. 6, 2006

(65) Prior Publication Data

US 2007/0076652 A1 Apr. 5, 2007

(30) Foreign Application Priority Data

Oct. 3, 2005 (JP) ............................ 2005-289872

(51) Int. Cl.
*H04W 4/00* (2009.01)
*G01C 21/26* (2006.01)

(52) U.S. Cl. ................. 370/313; 701/200; 340/995.27; 455/456.3

(58) Field of Classification Search ................. 370/229, 370/278, 310, 313; 340/988–996; 701/200–203, 701/206–211; 455/404.2, 418, 456.1–456.6, 455/512–514, 550.1, 561, 575.9
See application file for complete search history.

(56) References Cited

U.S. PATENT DOCUMENTS 6,208,932 B1 * 3/2001 Ohmura et al. ............. 701/200
6,957,128 B1 * 10/2005 Ito et al. ........................ 701/1
7,657,370 B2 * 2/2010 Nagase et al. ............... 701/207
2003/0142658 A1 * 7/2003 Ofuji et al. .................. 370/349
2005/0020223 A1 * 1/2005 Ellis et al. ................ 455/186.1
2005/0143915 A1 * 6/2005 Odagawa et al. ............ 701/211

FOREIGN PATENT DOCUMENTS

JP 10104009 A 4/1998
JP 2000055691 A 2/2000
JP 2000149721 A 5/2000
JP 2001160336 A 6/2001
JP 2001343979 A 12/2001
JP 2002-156233 A 5/2002
JP 2002-269607 A 9/2002
JP 2002-319089 A 10/2002
JP 2003-085689 A 3/2003
JP 20032994470 A 10/2003

* cited by examiner

*Primary Examiner*—Aung S Moe
*Assistant Examiner*—Habte Mered
(74) *Attorney, Agent, or Firm*—Sughrue Mion, PLLC

(57) ABSTRACT

An on-vehicle information terminal that conducts communication with a road side communication device (base station) located on a road includes a transmitter/receiver section that communicates with the road side communication device, a voice output section that outputs data from the road side communication device which is received by the transmitter/receiver section through a voice or images, and a control section having a priority table that stores information on categories representative of the type of data that is added with the data and transmitted from the road side communication device and priorities for determining orders in which the voice output section outputs the data in association with each other. The priority of the priority table is variable, and is changed on the basis of a signal from a priority setting switch due to the operation of a user or an instruction signal from the road side communication device.

11 Claims, 4 Drawing Sheets

102

ON-VEHICLE VARIABLE PRIORITY INFORMATION TERMINAL

BACKGROUND OF THE INVENTION

1. Field of the Invention

The present invention relates to an on-vehicle information terminal, and more particularly to an on-vehicle information terminal for conducting communication with respect to a base station that is located on a road.

2. Description of the Related Art

In recent years, systems have been popularized in which communication is conducted between a base station that is located on a road and a mobile station that is mounted on a vehicle, to thereby conduct electronic toll collection at a toll gate (generally called "ETC") . In those systems, electric wave communication is conducted between an ETC road device (base station) at the toll gate side and an ETC on-vehicle device (mobile station) at the vehicle side, to automatically collect the tolls of a toll road.

There have been proposed various systems that conduct other services by using the communication system used in those ETC systems (for example, refer to JP 2002-269607 A). In JP 2002-269607 A, there are proposed a system in which communication is conducted together with data other than communication data required to automatically collect the toll to supply information to a passenger in a vehicle when electric wave communication is conducted between the ETC road device (base station) at the toll gate side and ETC on-vehicle device (mobile station) at the vehicle side, or an advertisement delivery system that conducts an advertisement delivery at the time of communication or a discount at the time of receiving the advertisement.

On the other hand, in a VICS (vehicle information and communication system) that has been progressively diffused in recent years, road information such as traffic jam information is supplied from a base station that is located on a road.

In the system that supplies information at higher level by using data that has been received by the road information supplying means, it is difficult for a user to sort out useful data among a large amount of delivered data.

In order to solve the above problem, there has been proposed a navigation device in which plural pieces of information that have been received from the base station located on a road is classified and selected so that information required by the user is readily obtained (for example, refer to JP 2002-319089 A).

In addition, at the time of outputting data that has been received from the base station, when another data high in priority is received, data high in priority is outputted, and when the output of data high in priority is finished, original data that is being now reproduced is continuously outputted, to thereby improve the convenience of the user (for example, JP 2003-85689 A).

In the conventional on-vehicle information terminal disclosed in JP 2002-319089 A and JP 2003-85689 A, since data is sorted out according to the priority that is set according to the priority that is set in correspondence with the category of data in advance, the user is capable of obtaining necessary information without paying specific attention to data sorting out. However, the necessity of data changes according to the status, and there has arisen such a problem that the necessary information is not always selected when a fixed priority which is set in advance is used. Also, since the necessity of data depends on the user's preference, there has arisen such a problem that information required by the user is not always selected when the predetermined fixed priority is used.

SUMMARY OF THE INVENTION

The present invention has been made in view of the above circumstances, and therefore an object of the present invention is to provide an on-vehicle information terminal that is capable of sorting out information on categories according to the status or the preference of the user by dynamically changing a table for determining the priority.

According to an aspect of the present invention, an on-vehicle information terminal, which is mounted on a vehicle and conducts communication with a base station located on a road, includes: communication means for communicating with the base station; data output means for outputting, through voice or images, data received by the communication means from the base station; and a priority table for storing information on categories each representative of a type of data, the information being added to the data and transmitted from the base station, and priorities for determining an order in which the data output means outputs the data, such that the information and the priorities are associated with each other, in which the priorities of the priority table are variable.

According to another aspect of the present invention, the on-vehicle information terminal, which is mounted on a vehicle and conducts communication with a base station located on a road, includes: communication means for communicating with the base station; data output means for outputting, through a voice or images, data received by the communication means from the base station; and a priority table for storing information on categories each representative of a type of data, the information being added to the data and transmitted from the base station, and priorities for determining an order in which the data output means outputs the data, such that the information and the priorities are associated with each other. In the on-vehicle information terminal, the priorities of the priority table is variable, which allows the table for determining the priority to be dynamically changed to thereby make it possible to sort out information on the categories according to the status or the preference of the user.

DETAILED DESCRIPTION OF THE PREFERRED EMBODIMENTS

Now, a description will be given in more detail of preferred embodiments of the present invention with reference to the accompanying drawings.

First Embodiment

Figure 1:
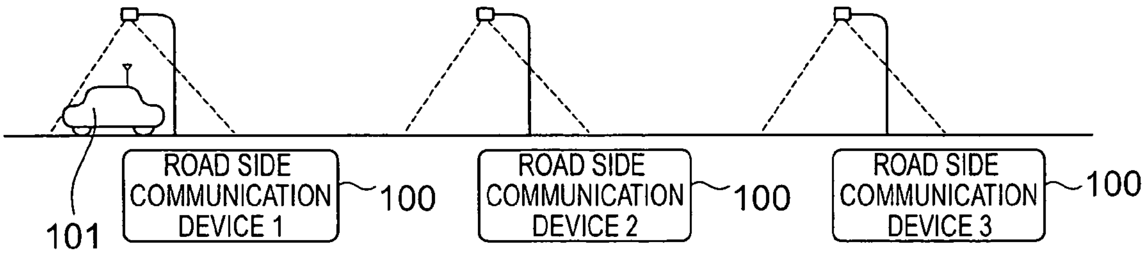
FIG. 1 is a diagram showing the entire structure of an information supply system using an on-vehicle information terminal according to a first embodiment of the present invention.

FIG. 1 is a diagram showing the entire structure of an information supply system using an on-vehicle information terminal according to a first embodiment of the present invention. As shown in FIG. 1, a plurality of road side communication devices 100 as base stations are located on a road at given intervals. Alternatively, the road side communication devices 100 may not be located at the given intervals but may instead be located at irregular intervals. Each of the road side communication devices 100 has a given communication area that is communicable. When a vehicle 101, on which a vehicle information terminal 102 (refer to FIG. 3) is mounted as a mobile station according to the present invention, travels and enters a communication area, the on-vehicle information terminal 102 that is mounted on the vehicle 101 receives various data that is transmitted to the respective vehicles 101 from each of the road side communication device 100, and outputs the data to a driver with a voice or image.

Figure 2:
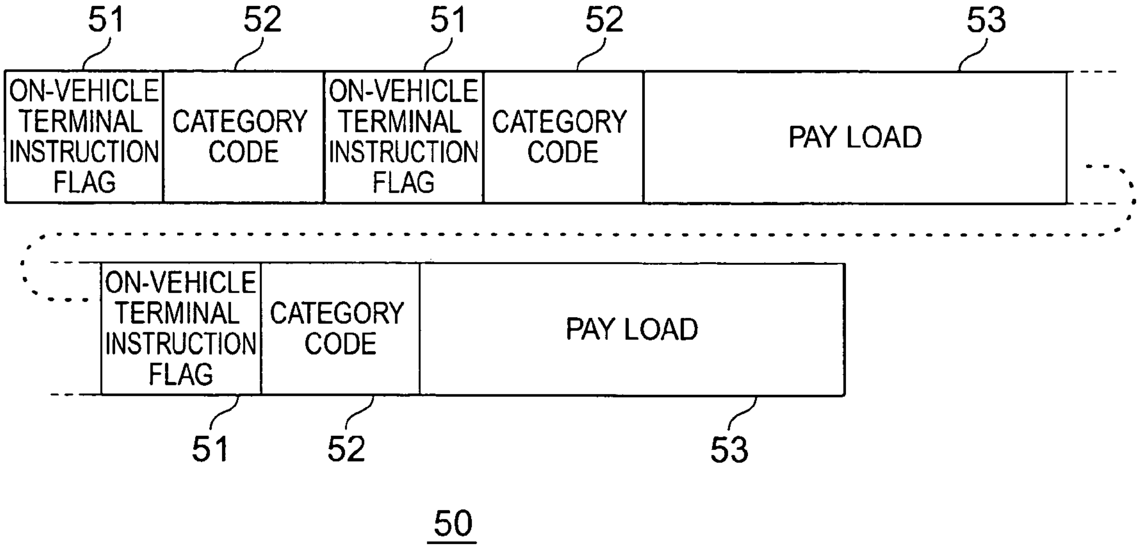
FIG. 2 is an explanatory diagram showing an example of data string that is transmitted from a road side communication device in the information supply system using the on-vehicle information terminal according to the first embodiment of the present invention.

Each of the road side communication devices 100 transmits various information such as information related to driving safety or advertising information, category codes to which the information belongs, and operation instruction information on the priority table provided in the on-vehicle information terminal 102 to the on-vehicle information terminal 102 that exists within a given communication area. FIG. 2 shows an example of the transmitted data string 50. As shown in FIG. 2, the data string 50 includes an on-vehicle terminal instruction flag 51, a category code 52, and a pay load 53. The on-vehicle terminal instruction flag 51 is set with a code that instructs an output of data from a voice output section 3 (refer to FIG. 3) to the on-vehicle information terminal 102, or a code that instructs the raising of the priority within a priority table 42 (refer to FIG. 3). In the case where the code that instructs the output of data is set in the on-vehicle terminal instruction flag 51, a code representative of the category of data is set in a subsequent category code 52. On the other hand, in the case where the code that instructs the raising of the priority is set in the on-vehicle terminal instruction flag 51, a category code of the category to be subjected to the raising of the priority is set in the subsequent category code 52. In other words, the code in this case is an instruction signal from the road side communication device 100 for changing the priority in each of the categories. The pay load 53 is inputted with voice data (or image data) for outputting from the on-vehicle information terminal 102. Only in the case where a code that instructs the output of data is set in the on-vehicle terminal instruction flag 51, the pay load 53 is further transmitted to the subsequent category code 52. The category is information representative of the type of data that is transmitted from the road side communication device 100 (for example, information related to safety, traffic jam information, the toll information of a toll road, advertising information, or construction information).

Figure 3:
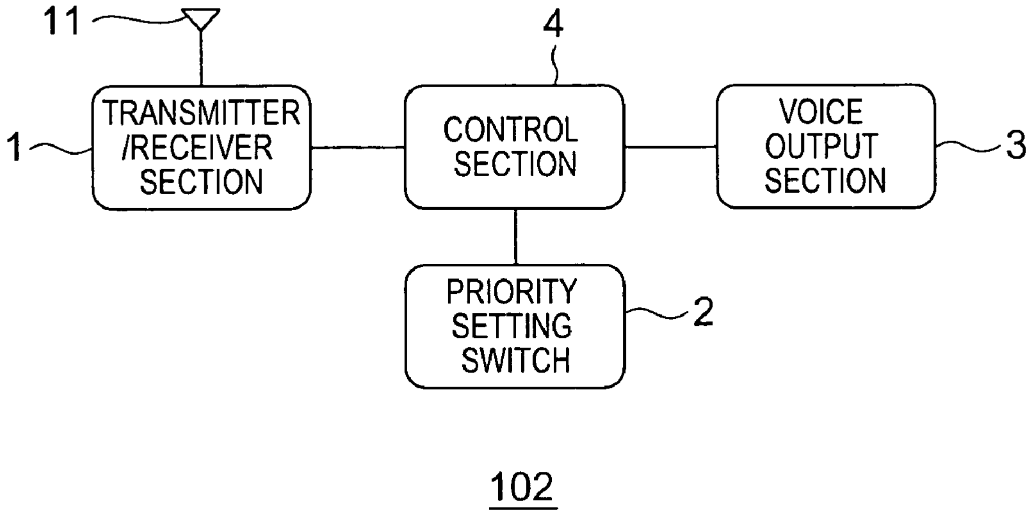
FIG. 3 is a diagram showing the structure of the on-vehicle information terminal according to the first embodiment of the present invention.
Figure 4:
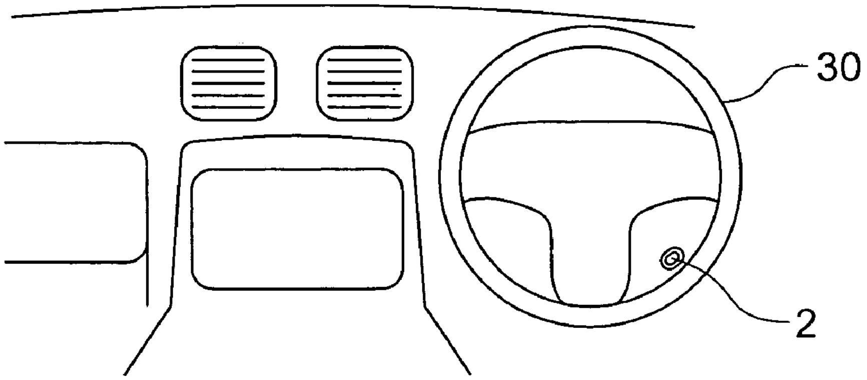
FIG. 4 is an explanatory diagram showing a location state of a priority setting switch of the on-vehicle information terminal according to the first embodiment of the present invention.

FIG. 3 is a structural diagram showing the structure of the on-vehicle information terminal 102 according to the present invention. As shown in FIG. 3, the on-vehicle information terminal 102 includes a transmitter/receiver section 1 (communicating means), a priority setting switch 2 (priority setting means), a voice output section 3 (data output means), and a control section 4. The transmitter/receiver section 1 is equipped with an antenna 11 for transmitting and receiving data. The transmitter/receiver 1 conducts communication with the road side communication device 100 through an antenna 11. As shown in FIG. 4, the priority setting switch 2 is located at a position where the operator can readily operate the priority setting switch 2, such as on a steering wheel 30. The priority setting switch 2 has two switches consisting of one switch for giving an instruction so as to raise the priority and another switch for giving an instruction so as to lower the priority. The voice output section 3 reads the voice data (or image data) from a voice data output buffer 43 (refer to FIG. 5) which is disposed within the control section 4, and converts the read voice data into a voice (or image) to output the voice. The control section 4 has a memory (not shown), and a receive buffer 41 (refer to FIG. 5), a priority table 42 (refer to FIG. 5), and a voice data output buffer 43 (refer to FIG. 5) are disposed within the memory. The receive buffer 41 records data that has been transmitted from the road side communication device 100 therein. The priority table 42 stores the priorities of the respective categories therein. The voice data output buffer records the voice data (or image data) that has been transmitted from the road side communication device 100 therein.

Figure 5:
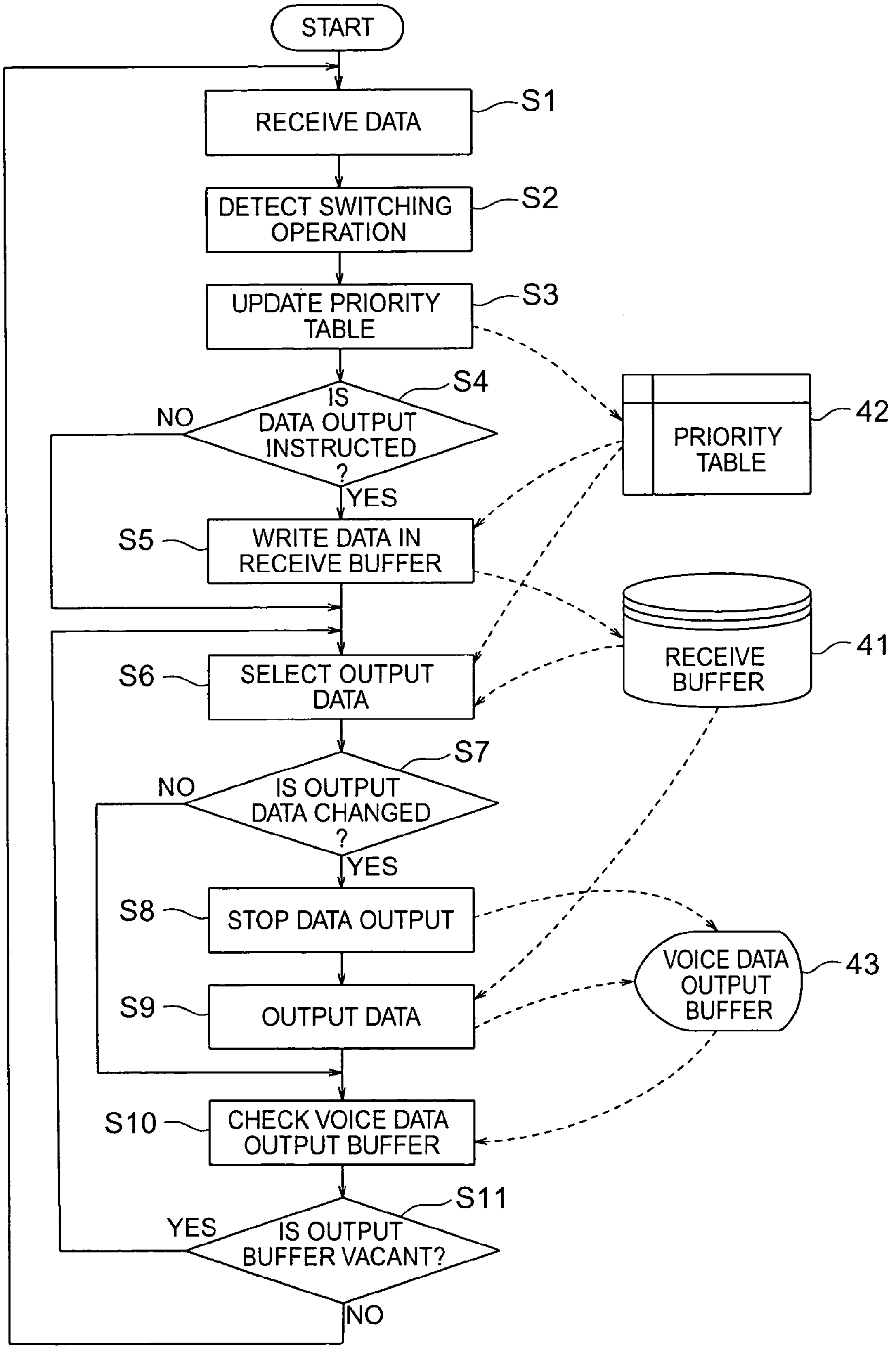
FIG. 5 is a flowchart showing a flow of processing of a control section of the on-vehicle information terminal according to the first embodiment of the present invention.

FIG. 5 is a flowchart showing the processing of the control section 4.

In the data receiving process of Step S1, the control section 4 controls the transmitter/receiver section 1, conducts communication with the road side communication device 100, and receives data from the road side communication device 100.

In Step S2, the control section 4 detects the operation status of a user (driver) related to the priority setting switch 2, and advances to Step S3. In other words, in Step S2, the control section 4 detects whether the user (driver) operates the priority setting switch 2, or not, and in the case that the user operates the priority setting switch 2, the control section 4 detects whether the operation raises or lowers the priority.

In Step S3, the control section 4 sets the priority table 42.

Figure 7:
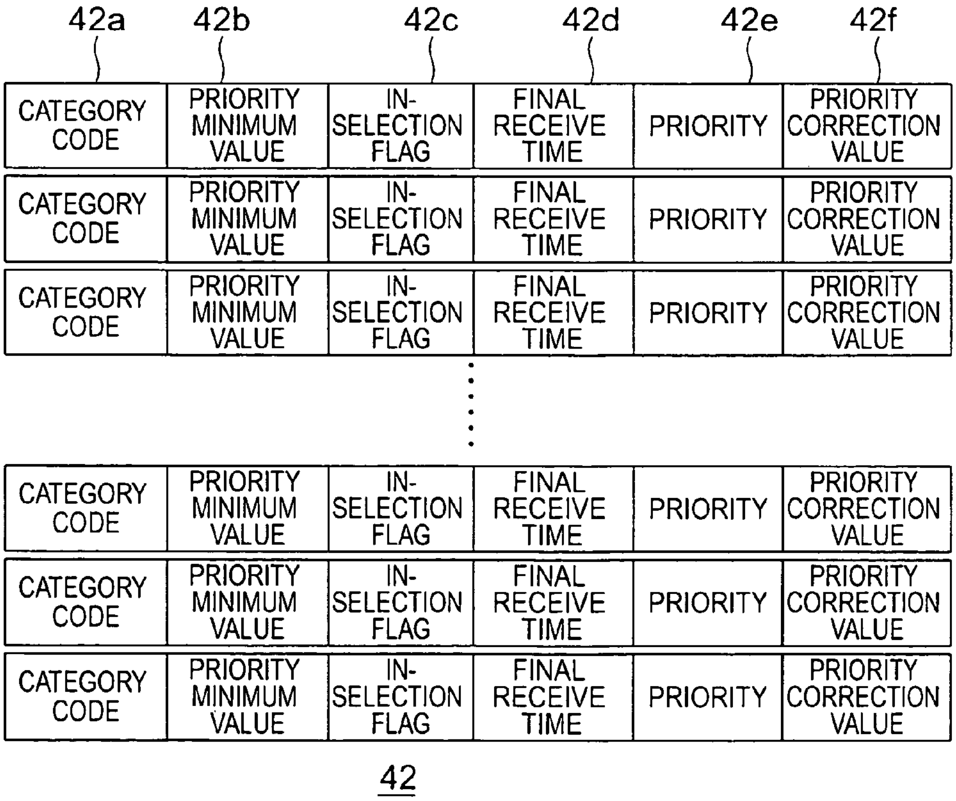
FIG. 7 is an explanatory diagram showing an example of the data format of a priority table of the on-vehicle information terminal according to the first embodiment of the present invention.

FIG. 7 shows the contents of data that is recorded in the priority table 42. Recorded in the priority table 42 are a category code 42*a*, a priority minimum value 42*b* (minimum threshold value), an in-selection flag 42*c*, a final reception time 42*d*, a priority 42*e*, and a priority correction value 42*f*. Predetermined fixed values are respectively stored in the category code 42*a* and the priority minimum value 42*b*.

The category code 42*a* is an inherent code for specifying the category, and is associated with each of the categories of data that is transmitted from the road side communication device 100 at 1:1. Also, a minimum value that can be taken by the priority correction value 42*f* that will be described later is recorded in the priority minimum value 42*b*. The in-selection flag 42*c* records data representative of ON therein in the case where the category of the in-selection flag 42*c* is a category to be operated by the priority setting switch 2. The in-selection flag 42*c* records data representative of OFF in the other cases. A time at which the control section 4 has most recently received the information on the category is recorded in the final reception time 42*d*. The priority 42*e* records the priority for outputting the category from the voice output section 3. In other words, the priority 42*e* is stored in association with each of the categories. The priority 42*e* is set with a predetermined value as an initial value (reference value) when the vehicle 101 starts to be used (at the time of manufacture). However, the priority 42e is dynamically changed according to the operation of the priority setting switch 2 by the user, or the code that instructs the raising of the priority that is set in the on-vehicle terminal instruction flag 51 of the received data string 50 received from the road side communication device 100. In the priority 42e and the priority correction value 42f are recorded the results of conducting the following processing.

In the above Step S1, in the case where the code that instructs the raising of the priority is set in the on-vehicle terminal instruction flag 51 of the received data string 50, a predetermined value is added to the value of the priority 42e of the priority table 42, and a value obtained by addition is reset in the priority 42e of the priority table 42 in the category corresponding to the category code that is set in the subsequent category code 52. As a result, since the priority 42e within the priority table 42 can be operated from the roadside communication device 100, it is possible to set the priority order according to the location.

In the above Step S2, in the case where the operation of the priority setting switch 2 that raises the priority is detected, a value obtained by adding a predetermined value to the value of the priority 42e of the category where the in-selection flag 42c of the priority table 42 is ON is reset in the priority 42e. In other words, a value of the priority 42e of the category of data that is being outputted by the voice output section 3, or a value of the priority 42e of the category of data that has been outputted most recently from the voice output section 3 is changed. Likewise, in the case where the operation of the priority setting switch 2 that lowers the priority is detected in Step S2, a value obtained by subtracting a predetermined value from the value of the priority 42e of the category where the in-selection flag 42c of the priority table 42 is ON is reset in the priority 42e. In this way, the user (driver) can readily change the priority due to the operation of the priority setting switch 2. Also, in the case where the value of the priority 42e is smaller than the priority minimum value 42b of the priority table 42 as a result of subtraction, the value of the priority 42e is reset in the value of the priority minimum value 42b. As a result, in the information on the category that is designated as important information in advance such as the category related to safety, it is possible to provide a limit so as not to excessively lower the priority due to mishandling of the user (driver), or the like.

In this way, upon completion of the calculation of the priority 42e, the control section 4 then sets the priority correction value 42f.

The control section 4 calculates an elapsed time (first elapsed time) from a time that is recorded in the final reception time 42d of the respective categories of the priority table 42. The control section 4 stores a coefficient that is predetermined in association with the elapsed time within the memory (not shown). Accordingly, in the case where the elapsed time is shorter than 3 minutes, the control section 4 sets a value obtained by multiplying a value of the priority 42e by a coefficient 1.0 in the priority correction value 42f by using the coefficient. Also, in the case where the elapsed time is equal to or longer than 3 minutes but shorter than 10 minutes, the control section 4 sets a value obtained by multiplying a value of the priority 42e by a coefficient 0.7 in the priority correction value 42f. Further, in the case where the elapsed time is longer than 10 minutes, the control section 4 sets 0 in the priority correction value 42f (in this case, a value of the coefficient is 0). Because the control section 4 sets the priority correction value 42f according to the elapsed time since the data is received, the control section 4 can suppress the priority of the information that has been old and unimportant to a lower one.

In addition, the control section 4 calculates an elapsed time (a second elapsed time) since the voice output section 3 outputs the previous data. The control section 4 may record a time at which the data is outputted within the priority table 42, or record the time within the voice output section 3. The control section 4 stores the predetermined coefficients in association with the elapsed time within the memory (not shown). Accordingly, the control section 4 resets a value obtained by multiplying a value of the priority correction value 42f by a coefficient 0.3 in the priority correction value 42f with respect to the category where the elapsed time since the data is previously outputted is shorter than 1 minute by using the coefficient. Also, in the case where the elapsed time is equal to or longer than 1 minute but shorter than 2 minutes, the control section 4 resets a value obtained by multiplying the value of the priority correction value 42f by a coefficient 0.5 in the priority correction value 42f. Also, in the case where the elapsed time is equal to or longer than 2 minutes, the control section 4 resets a value obtained by multiplying the value of the priority correction value 42f by a coefficient 0.7 in the priority correction value 42f. As a result, since the control section 4 sets the priority correction value according to the elapsed time since the information on the same category is previously outputted, it is possible to prevent the convenience of the user (driver) from being damaged by frequently outputting the information on the same category.

As for the category that is designated as the important information in advance such as the category related to safety, the control section 4 sets the value of the priority 42e in the priority correction value 42f as it is, not depending on the elapsed time since data is received or the elapsed time since data is outputted, and does not change the value of the priority 42e after that time. As a result, since there is a limit so as not to excessively lower the priority of the important information such as the category related to safety, the control section 4 can prevent a situation in which the necessary important information is not outputted due to the mishandling of the user (driver).

A description will be returned to FIG. 5. In Step S4 of FIG. 5, when the data output instruction is set in the on-vehicle terminal instruction flag 51 of the data string 50 that has been received from the road side communication device 100, the control section 4 advances to a receive buffer write process of Step S5. On the other hand, when the data output instruction is not set in the on-vehicle terminal instruction flag 51, the control section 4 skips the receive buffer writing process of Step S5 and shifts to the output data selecting process of Step S6.

In Step S5, when the control section 4 retrieves from the priority table 42 the value of the priority correction value 42f of the category corresponding to the category code 52 of the data string 50 (FIG. 2) which has been received by the on-vehicle information terminal 102 from the road side communication device 100, and when the retrieved priority correction value 42f is equal to or larger than a given value, the control section 4 records various information, the category code, and the receive time of data in the receive buffer 41. On the other hand, when the retrieved priority correction value 42f is lower than the predetermined value, the control section 4 abandons the received data without recording the data. As a result, since the control section 4 can reduce the temporary storage capacity that holds data, the inexpensive on-vehicle information terminal can be realized.

Figure 6:
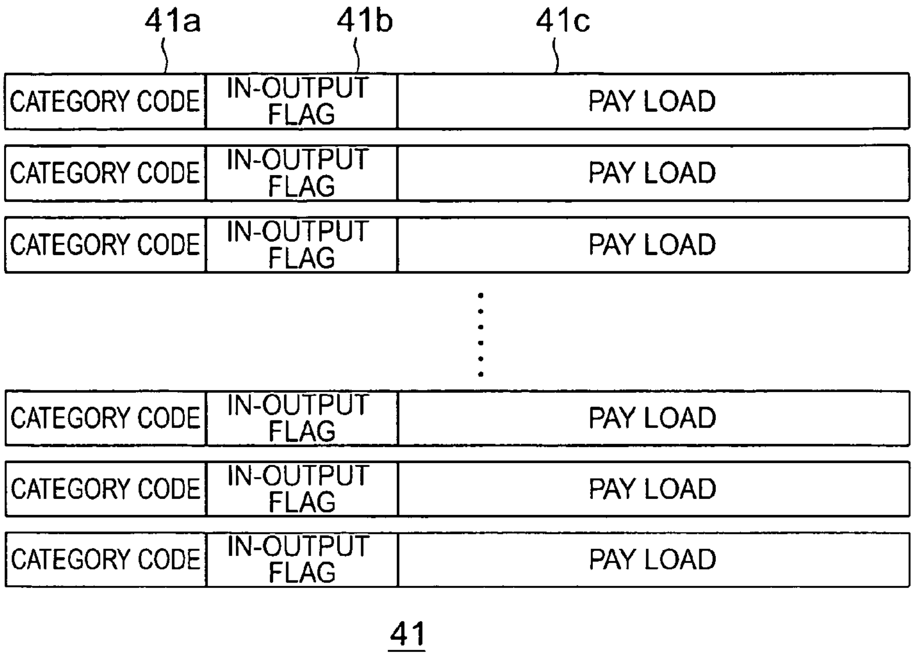
FIG. 6 is an explanatory diagram showing an example of a data format of a receive buffer of the on-vehicle information terminal according to the first embodiment of the present invention.

The contents of data that is recorded in the receive buffer 41 are shown in FIG. 6. The receive buffer 41 saves a category code 41*a* representative of the category of received data, an in-output flag 41*b*, and contents (pay load) 41*c* of the received data therein.

In the output data selecting process of Step S6, the control section 4 selects data which is largest in the value of the priority correction value 42*f*, that is, first data in the descending order as output data, among the priority correction value 42*f* corresponding to the respective categories of the data that has been recorded in the receive buffer 41.

On the other hand, the control section 4 deletes data, in which the priority correction value 42*f* corresponding to the category of data that has been recorded in the receive buffer 41 is lower than a predetermined value, from the receive buffer 41. Also, the control section 4 deletes data, in which the order in the case where the priority correction value 42*f* corresponding to the category of data that has been recorded in the receive buffer 41 is arranged in the descending order is lower than a predetermined order, from the receive buffer 41.

In Step S7, in the case where data where the in-output flag 41*b* is ON in the receive buffer 41 is different from data that is selected in Step S6, the control section 4 advances to a data output stop process of Step S8. On the other hand, in the case where those data are the same, the control section 4 skips Step S8 and Step S9, and advances to a voice data output buffer check process of Step S10.

In the data output stop process of Step S8, when there is data that is now being outputted, the control section 4 abandons the contents of the voice data output buffer 43, and sets the in-output flag 41*b* corresponding to the data that is now being outputted in the receive buffer 41 to OFF.

In the data output process of Step S9, the control section 4 transfers data to the voice data output buffer 43 from the receive buffer 41, and sets the output flag corresponding to the flag 41*b* that is now being outputted in the receive buffer 41 to ON. As a result, the control section 4 outputs the output data that is selected in Step S6 from the voice output section 3 as voice or image.

In the voice data output buffer check process of Step S10, the control section 4 confirms whether the voice data output buffer 43 is vacant, or not. In Step S11, when the voice data output buffer 43 is vacant, the control section 4 advances to the output data selecting process of Step S6. On the other hand, when the voice data output buffer 43 is not vacant in Step S11, the control section 4 advances to the data receiving process of Step S1.

As described above, in this embodiment, the control section 4 can dynamically change the value of the priority 42*e* of the priority table 42 that determines the priority for outputting the received information according to the operation of the priority setting switch 2 of the user (driver), or setting of the code that instructs the raising of the priority to the on-vehicle terminal instruction flag 51 of the data string 50 which is transmitted from the road side communication device. 100. Accordingly, it is possible to sort out the information on the category according to the status or the preference of the user (driver). On the other hand, in the conventional art, the priority is fixed when the on-vehicle information device sorts out the information.

Also, in the case where the priority setting switch 2 is operated, the category that is now being outputted or the category of data that has been outputted most recently is automatically determined as the category to be operated. Accordingly, it is unnecessary to select the category when the priority of the category is set, and a load of the user (driver) can be reduced.

Also, the priority setting switch 2 has two buttons consisting of one button that raises the priority and another button that lowers the priority. Accordingly, the priority can be arbitrarily set by the operation of only two buttons when setting the priority of the category.

Also, there is a limit so as not to excessively lower the value of the priority correction value 42*f* with respect to the information on the category that is designated as the important information in advance as with the category related to safety. Accordingly, it is possible to prevent a situation in which the necessary safety information is not outputted by the mishandling of the user.

Also, the code that instructs the raising of the priority can be set in the on-vehicle terminal instruction flag 51 of the data string 50 that is transmitted from the road side communication device 100. Accordingly, since the value of the priority 42*e* in the priority table 42 can be operated by the road side communication device (base station), it is possible to set the priority order according to the location.

Also, the priority correction value 42*f* is set according to an elapsed time since the information of the same category is outputted previously. Accordingly, it is possible to prevent the user's convenience from being damaged by frequently outputting the information of the same category.

Also, because the priority is set according to the elapsed time since the data is received, it is possible to prevent the user's convenience from being damaged by outputting the information that has been old and unimportant.

Also, a formula for calculating the priority correction value of the category that is designated as the important information in advance such as the category related to safety is made different from a formula for calculating the priority correction value of the other categories, and a limit is so provided as not to excessively lower the value of the priority correction value 42*f* of the category that is designated as the important information. Accordingly, it is possible to prevent a situation in which the necessary safety information is not outputted due to the mishandling of the user.

Also, since the received data composed of the information of the category whose priority correction value is lower than a predetermined threshold value is abandoned without outputting it, the temporal storage capacity that holds the received data can be reduced. As a result, the inexpensive on-vehicle information terminal is obtained.

Also, in the case where the value of the priority correction value is set in the descending order, since the received data whose priority correction value has an order that is equal to or lower than a predetermined order is not outputted but abandoned, the temporal storage capacity that holds the received data can be reduced. As a result, the inexpensive on-vehicle information terminal is obtained.

In the above description, the example in which voice data or image data is outputted from the voice output section 3 was described. However, the present invention is not limited to that case, but may output both of the voice data and the image data.

What is claimed is:

1. An on-vehicle information terminal that is mounted on a vehicle and conducts communication with a base station located on a road, comprising;

a transceiver which communicates with the base station;

data output processor which converts data received by the transceiver from the base station into voice data or image data as output data, and outputs the output data; and a priority table for storing information on categories each representative of a type of data, the information being added to the data and transmitted from the base station, and priorities for determining an order in which the data output processor outputs the data, such that the information and the priorities are associated with each other, wherein the priorities in the priority table are variable, and wherein the on-vehicle information terminal further comprises:

first elapsed time measuring processor which measures an elapsed time since the transceiver received the data as a first elapsed time;

first coefficient storage unit which stores a first predetermined coefficient every first elapsed time; and first priority correcting means processor which extracts the first predetermined coefficient from the first coefficient storage unit based on the first elapsed time measured by the first elapsed time measuring processor and assigns an updated first priority with a value obtained by multiplying the value of a first priority in the priority table by the first predetermined coefficient.

2. An on-vehicle information terminal according to claim 1, further comprising priority setting switch for setting values for priorities, wherein a value of the priority for the category of the data that is being outputted by the data output processor or the category of the data that has been outputted most recently is changed when the priority setting switch is operated.

3. An on-vehicle information terminal according to claim 2, wherein the priority setting switch gives an instruction to assign higher priority and gives an instruction to assign lower priority.

4. An on-vehicle information terminal according to claim 2, wherein a category representative of data that is predesignated as important among the categories in which a predetermined minimum threshold value for the priority is set, and when the value of the priority falls to or below the predetermined minimum threshold value, the predetermined minimum threshold value is set as the value of the priority.

5. An on-vehicle information terminal according to claim 4, wherein the first priority correcting processor reassigns values of the priorities tar categories other than the category representative of data that is predesignated as important.

6. An on-vehicle information terminal according to claim 4, further comprising:

second elapsed time measuring processor for measuring an elapsed time since the data output processor last outputted the data of the same category as a second elapsed time;

second coefficient storage unit for storing a second predetermined coefficient every second elapsed time; and second priority correcting processor which extracts the second predetermined coefficient from the second coefficient storage unit based on the second elapsed time measured by the second elapsed time measuring processor and assigns an updated second priority with a value obtained by multiplying the value of a second priority by the second predetermined coefficient.

7. An on-vehicle information terminal according to claim 6, wherein the second priority correcting processor reassigns the values of the priorities for categories other than the category representative of data that is predesignated as important.

8. An on-vehicle information terminal according to claim 1, wherein the base station transmits an instruction signal for changing the priority for each of the categories, and when the transceiver receives the instruction signal, the priority for the category is changed.

9. An on-vehicle information terminal according to claim 1, wherein in a case where the priority of the data received by the transceiver is lower than a given value, the data output processor abandons the data without outputting the data.

10. An on-vehicle information terminal according to claim 1, wherein in a case where the order of the priority is equal to or lower than a given order, the data output processor abandons the data without outputting the data.

11. The on-vehicle information terminal according to claim 1, wherein the information on categories each representative of a type of data comprises:

information related to safety, traffic jam information, toll information, advertising information, and construction information.

* * * * *